3,168,985
TRANSMISSION POLARIZER
John G. Troup, 1967 Victoria Park Ave., Scarborough, Ontario, Canada, and Thomas L. Joyce, 3177 Sheppard Ave. E., Agincourt, Ontario, Canada
Filed Aug. 31, 1962, Ser. No. 220,625
3 Claims. (Cl. 240—9.5)

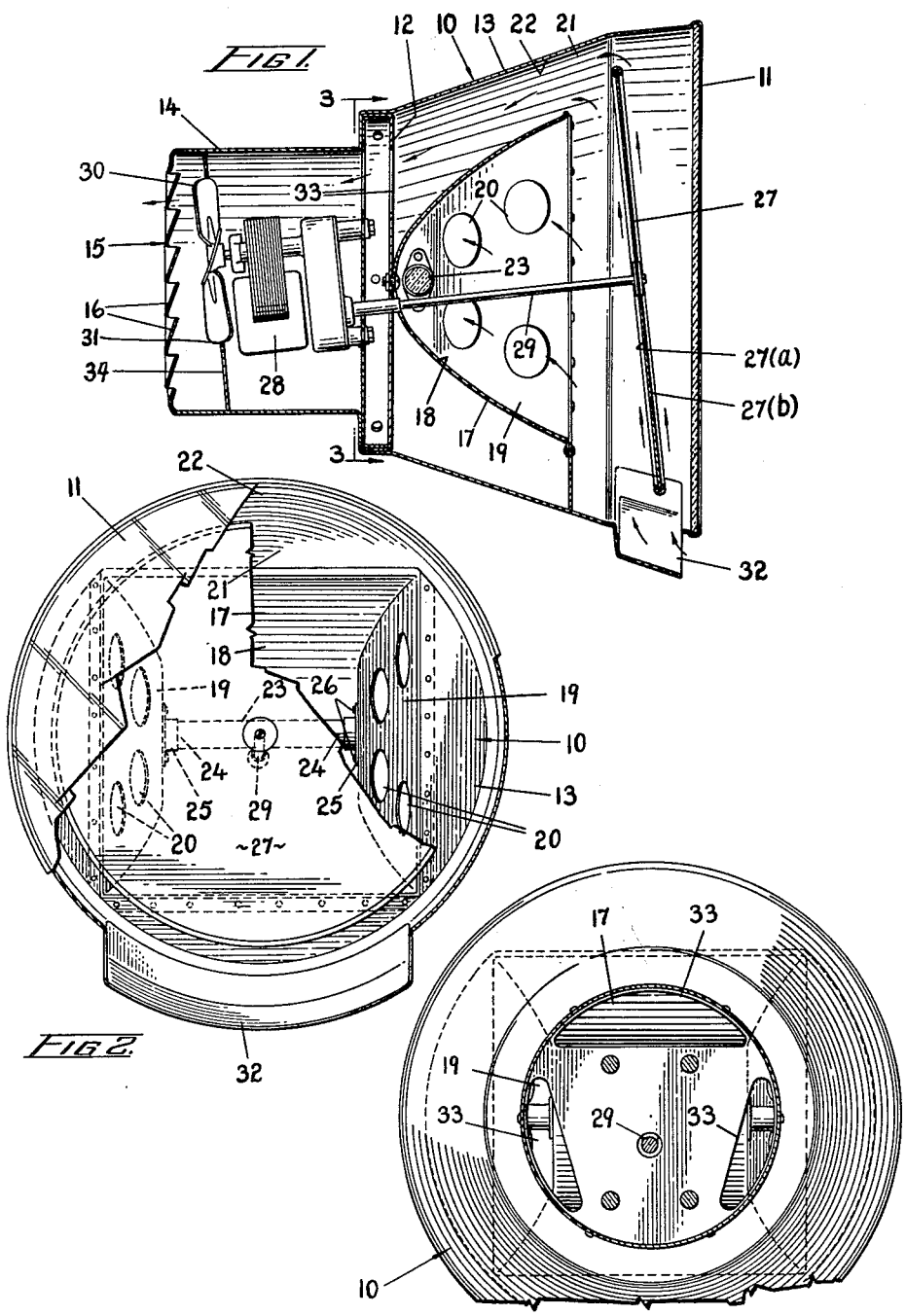
Feb. 9, 1965   J. G. TROUP ETAL   3,168,985
TRANSMISSION POLARIZER
Filed Aug. 31, 1962
INVENTORS
JOHN GEORGE TROUP
THOMAS LESLIE JOYCE
BY George H. Riches
ATTORNEY

This invention relates to a polarizer and more particularly to a device for producing by transmission, polarized light, for direct front-lighting of outdoor polarized surfaces of billboards, posters, signs and the like, whereby the illusion of motion or animation is created upon the surfaces.

It is well known in the art that when light is passed through a rotating light-transmitting polarizing disc using a polarizer and is then cast upon specially cut strips of polarized sheet, selectively mounted on an opaque material covering advertising subject matter thereon, the effect of motion or animation is accomplished. A brief discussion of prior art polarizers and their disadvantages follows.

Heretofore, a polarizers in use for outdoor advertising, essentially included the components of a light-producing source capable of providing sufficient illumination and a reflector to reflect the light through a rotating polarizing disc and cast it upon a specially treated surface of polarized film, as previously described, to create the desired effect of motion or animation. Such a polarizer was characterized by its great weight and size which were attributable to the structural design of the polarizer. The light source, to provide the requisite illumination for outdoor advertising purposes, was of the kind used to illuminate stadiums and the like and consequently required a reflector large enough to reflect the light emanating from the source. To complete the essential components of the polarizer a rotating polarizing disc having a diameter of about 50 inches was usually required. The size and weight of the polarizer having the above components was further augmented by the necessity of locating the shaft operatively connecting the disc to the motor, and the motor, apart from the components to avoid cutting the light beam which would cause shadows.

The disadvantages attending the aforementioned polarizer were twofold. Firstly, because of the large size and weight the polarizer proved unsatisfactory for mounting on outdoor advertising structures such as billboards which were structurally unsuitable for supporting the combined size and weight of the polarizer components. Furthermore, the size and weight created the additional disadvantage, in many instances, of blocking part of the advertisement due to the fact that the effective operating distance was of particularly low magnitude. Secondly, the components were exposed to the atmosphere and subjected to rain and other adverse weather effects, including the problem of flying birds colliding with the immense disc, causing severe damage to the polarizer and necessitating frequent replacements to extend the operating life of same.

The aforementioned disadvantages are overcome by the present invention which provides an encased lightweight, compact unit adaptable to illuminate outdoor advertising subject matter to create the effect of motion thereon.

Accordingly, it is an object of the present invention to provide a light-weight, portable, compact unit, easily adaptable to illuminate outdoor advertising subject matter on billboards, etc. to create the effect of motion or animation thereon.

Another object of this invention is to provide a polarizer, the components of which are encased to protect them from the adverse effects of weather and flying birds.

Another object is to provide an encased polarizer constructed with means to air cool a rotating polarizing disc. The air cooling means may be natural but preferably are forced air cooling.

Another object of this invention is to provide a compact polarizer which illuminates outdoor advertising with no appreciable interference by shadows encountered with the prior art polarizers.

A more detailed disclosure of the invention and its mode of operation is provided below and is to be read in conjunction with the accompanying drawings in which:

FIGURE 1 is a side elevation in cross section of the polarizer;

FIGURE 2 is a front elevation partly broken away to show the interior air-venting of the polarizer of FIGURE 1; and FIGURE 3 is a cut-away rear elevation taken in the plane 3—3 of FIGURE 1.

The transmission polarizer as illustrated in FIGURE 1 comprises a casing 10 provided with a front window or transparent closure member 11 and having an apertured supporting wall 12 separating a funnel-shaped front section 13 and a substantially cylindrical rear section 14 enclosed at its end by an air-vented end member 15 permitting the flow of air from within the casing into the atmosphere. The venting is achieved by means of a series of vertically aligned louvres 16 which inhibit the entry of water in the form of rain or snow, into the casing. It should be apparent that other casings possessing different configurations, such as those characterized by a rectangular cross-section and the like, may be effectively utilized. Furthermore, although the use of vertically aligned louvres 16 for air-venting from the rear-section 14 to the atmosphere have been illustrated, any type of end member capable of permitting venting, may be substituted; as for example, a cap-like end member may be fitted over the end of the rear-section, so that a sufficient air space is provided between the inner wall of the cap and the outer wall of the end of the rear-section, permitting air to flow within the space.

Mounted within the front section of the casing is a concavo-convex light reflector 17 consisting of a light-reflecting member 18 of substantially parabolic cross-section mounted between a pair of spaced apart walls 19, and attached to the apertured supporting wall 12. The walls 18 are provided with air passages 20 as shown in FIGURE 1. A further air passage 21 is provided between the top of the reflector 17 and the inside top surface 22 of the front section 13 of the casing 10. These air passages permit the flow of air from the front section 13 of casing 10, and particularly from the reflector 17, to the rear section 14 of casing 10 as hereinafter more fully described.

An electrically operative light-producing source 23 is removably mounted within the rear portion of the reflector 17. Each end portion 24 of the source 23 is supported by an insulated bracket 25 attached to one of the walls 19 by means of screws 26 as shown in FIGURE 2. The output of the light source 23 is reflected by the light-reflecting member 18 through a rotatable light-transmitting polarizing disc 27 operatively mounted between the reflector 17 and the front window 11. The source must be capable of illuminating the advertising subject matter and simultaneously provide sufficient light to achieve the effect of motion or animation. Furthermore, in selecting the source, consideration must be given to the fact that approximately ⅓ of the light output will be lost in the process of polarization. A source having a luminous flux of 5000 lumens may be suitable for short distances between the polarizer and the surface to be illuminated for greater distances, however, a source of at least 10,000 lumens is preferred.

Rotation of the disc 27 is accomplished by a geared motor 28 supported by the apertured wall 12 within the rear section 14 of casing 10 and a rotatable shaft 29, operatively connecting the motor 28 to the disc 27. The shaft 29 has one end connected to motor 28 and extends upwardly through the supporting wall 12, enters the reflector 16 below the source 23 and has its other end attached to the centre of the disc 27 so that the centre is coplanar with the source 23. The disc 27 may be rotated in a known alternative manner utilizing rim-driving means. By enclosing the components of the polarizer within the casing 10 the heat generated by the light source 23 may cause the polarizing disc 27 to deform and decompose within a short interval of time, unless the disc is cooled below its decomposition temperature and this is achieved by the air passages in the casing as previously described and the forced air cooling means associated therewith.

The forced air cooling is provided by a fan 30 operatively mounted on motor 28 in the rear section 14 of casing 10. The fan 30 draws air into casing 10 through the air-intake 32 mounted in the lower part of the front section 13 of casing 10 between the front window 11 and the reflector 17. The air entering the front section 13 is caused to flow in the direction of the arrows as illustrated in FIGURE 1 that is, upwardly in contact with both faces 27(a) and 27(b) of the disc, within and above the reflector 17 through the air passages 20 and 21, through the apertures 33 of the supporting wall 12 into the rear section 14, where it is discharged to atmosphere through the louvres 15.

Although not essential, an annular baffle member 34 mounted within the rear section 14 with its inner circumference in close proximity to the pitch line of the fan 30 assists in creating a greater suction by the fan and in preventing the formation of air turbulence around the blade ends 31 of fan 30.

What we claim as new and desire to protect by Letters Patent of the United States is:

1. A polarized light transmitter, said transmitter comprising a casing, a transparent closure member in said casing adjacent one end thereof, a light-producing source and a perforate-concave light reflector, said light-producing source mounted within said reflector, a rotatable polarizing disc situated within said casing intermediate the concave side of said reflector and said closure member, a fan, motor means, means connecting said motor means to said fan, drive means connecting said motor means to said polarizing disc for rotating said polarizing disc, air intake vent means in said casing adjacent to said polarizing disc, air exhaust vent means in said casing, said fan being disposed adjacent said air exhaust vent means for forcing air out of said casing through said exhaust vent means and for drawing air into said casing through said air intake vent means; whereby the fan draws air through the intake vent means, over all of the surfaces of the disc and all of the surfaces of the reflector, and out through the air exhaust vent means.

2. A light-transmitter as defined in claim 1 wherein said reflector is provided with an opening therethrough, the means connecting the motor means to the polarizing disc comprising a shaft, said shaft being attached to said polarizing disc and extending through the opening in said reflector and being connected to said motor means.

3. A light-transmitter as defined in claim 1 wherein said light source has a luminous flux of at least 5,000 lumens.

References Cited in the file of this patent
UNITED STATES PATENTS

| | | |
|---|---|---|
| 2,295,863 | Paradis | Sept. 15, 1942 |
| 2,350,761 | Hutchinson | June 6, 1944 |
| 2,431,520 | Streich | Nov. 25, 1947 |
| 2,454,765 | Braunsdorff | Nov. 30, 1948 |
| 2,506,134 | Burchell | May 2, 1950 |
| 2,506,135 | Burchell | May 2, 1950 |
| 2,846,799 | Viszlocky et al. | Aug. 12, 1958 |
| 2,997,574 | Miskella | Aug. 22, 1961 |